(12) United States Patent
Ayatsuka

(10) Patent No.: US 10,354,172 B2
(45) Date of Patent: Jul. 16, 2019

(54) VERIFICATION DEVICE, VERIFICATION METHOD, AND VERIFICATION PROGRAM

(71) Applicant: Cresco Ltd., Tokyo (JP)

(72) Inventor: Yuji Ayatsuka, Tokyo (JP)

(73) Assignee: Cresco Ltd., Tokyo (JP)

( * ) Notice: Subject to any disclaimer, the term of this patent is extended or adjusted under 35 U.S.C. 154(b) by 74 days.

(21) Appl. No.: 15/681,455

(22) Filed: Aug. 21, 2017

(65) Prior Publication Data

US 2018/0053072 A1 Feb. 22, 2018

(30) Foreign Application Priority Data

Aug. 22, 2016 (JP) .................. 2016-161871

(51) Int. Cl.
| | | |
|---|---|---|
| *G06K 9/62* | (2006.01) | |
| *G06N 20/00* | (2019.01) | |
| *G06T 7/00* | (2017.01) | |

(52) U.S. Cl.
CPC ......... *G06K 9/6269* (2013.01); *G06K 9/6227* (2013.01); *G06K 9/6292* (2013.01); *G06N 20/00* (2019.01); *G06T 7/0012* (2013.01); *G06T 2207/30096* (2013.01)

(58) Field of Classification Search
CPC .. G06K 9/6269; G06K 9/6227; G06K 9/6292; G06T 7/0012; G06T 2207/30096; G06N 99/005

See application file for complete search history.

(56) References Cited

U.S. PATENT DOCUMENTS

| | | |
|---|---|---|
| 7,298,877 B1 | 11/2007 | Collins et al. |
| 2006/0018524 A1 | 1/2006 | Suzuki et al. |

FOREIGN PATENT DOCUMENTS

| | | |
|---|---|---|
| JP | 2005-115525 A | 4/2005 |
| JP | 2014-135092 A | 7/2014 |
| JP | 2015-176169 A | 10/2015 |
| JP | 2015-176283 A | 10/2015 |

OTHER PUBLICATIONS

Extended European Search Report dated Nov. 3, 2017, of corresponding European Application No. 17186882.1.
Wang, L., et al., "Classification of Hepatic Tissues from CT Images Based on Texture Features and Multiclass Support Vector Machines," May 26, 2009, *Network and Parallel Computing*, Springer International Publishing, pp. 374-381.
Kuncheva, L., "Chapter 4: Combining Label Outputs," *Combining Pattern Classifiers: Methods and Algorithms*, Aug. 5, 2014, John Wiley & Sons, Inc., pp. 111-142.
https://blogs.nvidia.com/blog/2016/05/10/deep-learning-chest-x-rays/.

*Primary Examiner* — Qian Yang
(74) *Attorney, Agent, or Firm* — DLA Piper LLP (US)

(57) ABSTRACT

A verification device includes an acquisition unit that acquires image data which is an object to be verified, a classification unit that includes a plurality of classifiers caused to learn the image data acquired by the acquisition unit, using a plurality of different pieces of learning data, with respect to a target event to obtain values indicating a possibility corresponding to the event, and a specification unit that specifies a state of the object to be verified which is the image acquired by the acquisition unit from the values obtained by the plurality of classifiers.

6 Claims, 7 Drawing Sheets

VERIFICATION DEVICE, VERIFICATION METHOD, AND VERIFICATION PROGRAM

TECHNICAL FIELD

This disclosure relates to a verification device, a verification method, and a verification program and, more particularly, to a verification device using machine learning, a verification method, and a verification program.

BACKGROUND

Hitherto, images have been used for a variety of verifications. For example, a lesion and the like have been confirmed using images regarding a human's features. In addition, the presence or absence of foreign matter mixed during the manufacture of a product and a defect have also been confirmed using an image of the product. Further, a defect of a semiconductor part disposed on a semiconductor substrate has also been confirmed using an image of the manufactured semiconductor substrate. When such confirmation is performed, a machine learning technique called "deep learning" has also been used as auxiliary means therefor to avoid oversight.

As a method using machine learning, a method using a classifier caused to learn using learning data is known. For example, when a "lesion" being a change in mind and body which is generated due to a disease is verified from image data by using machine learning, a plurality of pieces of image data of a "positive example" having a target lesion and a plurality of pieces of image data of a "negative example" having no target lesion are prepared and set to be learning data.

At that time, the accuracy of the classifier depends on learning data. However, the accuracy does not necessarily become higher as the number of pieces of learning data increases. For example, an increase in the number of pieces of data may results in a state called "over-learning" in which the accuracy in another data decreases due to excessive application to given data. When the accuracy of the classifier is improved by avoiding the over-learning, a variety of tunings are required.

Examples of the related art include Japanese Unexamined Patent Application Publication No. 2015-176283, Japanese Unexamined Patent Application Publication No. 2015-176169, Japanese Unexamined Patent Application Publication No. 2014-135092, Japanese Unexamined Patent Application Publication No. 2005-115525, and https://blogs.nvidia.com/blog/2016/05/10/deep-learning-chest-x-rays/ (searched on Jul. 22, 2016).

As described above, in a case where a classifier is used, a variety of adjustments such as tuning are required, and thus it is difficult to easily obtain a highly accurate result. Therefore, for example, it is difficult for a user or the like who is not familiar with machine learning to easily obtain a highly accurate result by using machine learning.

It could therefore be helpful to provide a verification device capable of easily obtaining a highly accurate verification result by using machine learning.

SUMMARY

I thus provide a verification device including an acquisition unit that acquires image data which is an object to be verified, a classification unit that includes a plurality of classifiers caused to learn the image data acquired by the acquisition unit, using a plurality of different pieces of learning data with respect to a target event, to obtain values indicating a possibility corresponding to the event, and a specification unit that specifies a state of the object to be verified which is the image acquired by the acquisition unit from the values obtained by the plurality of classifiers.

According to a verification device, a verification method, and a verification program, it is possible to easily obtain a highly accurate verification result by using machine learning.

I also provide a verification method including an acquisition step of acquiring image data which is an object to be verified; a classification step of obtaining values indicating a possibility corresponding to a target event by a plurality of classifiers caused to learn the acquired image data, using a plurality of different pieces of learning date with respect to the target event; and a specification step of specifying a state of the object to be verified which is the acquired image from the obtained values.

I further provide a verification program causing a computer to execute functions of acquiring image data which is an object to be verified; causing a plurality of classifiers to learn the acquired image data, using a plurality of different pieces of learning data with respect to a target event, and to obtain values indicating a possibility corresponding to the target event; and specifying a state of the object to be verified which is the acquired image from the values obtained by the plurality of classifiers.

DETAILED DESCRIPTION

Figure 1:
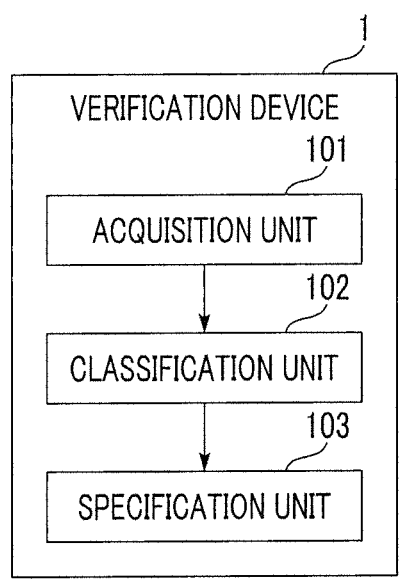
FIG. 1 is a block diagram illustrating an example of a verification device.

My verification device verifies an event corresponding to an object to be verified, by using image data which is the acquired object to be verified. Hereinafter, a verification device will be described with reference to the accompanying drawings. In the following description, the same components will be denoted by the same reference numerals and signs, and a description thereof will not be repeated. Meanwhile, in the following description, a description will be given on the assumption that the possibility of presence or absence of a lesion is verified.

As illustrated in FIG. 1, a verification device 1 includes an acquisition unit 101, a classification unit 102, and a specification unit 103. The acquisition unit 101 acquires image data which is an object to be verified. The classification unit 102 includes a plurality of classifiers caused to learn the image data acquired by the acquisition unit 101, using a plurality of different pieces of learning data with respect to a target event, to obtain values indicating a possibility corresponding to the event. The specification unit 103 specifies the state of the object to be verified which is the image acquired by the acquisition unit 101 from the values obtained by the plurality of classifiers.

Verification Device

Figure 2:
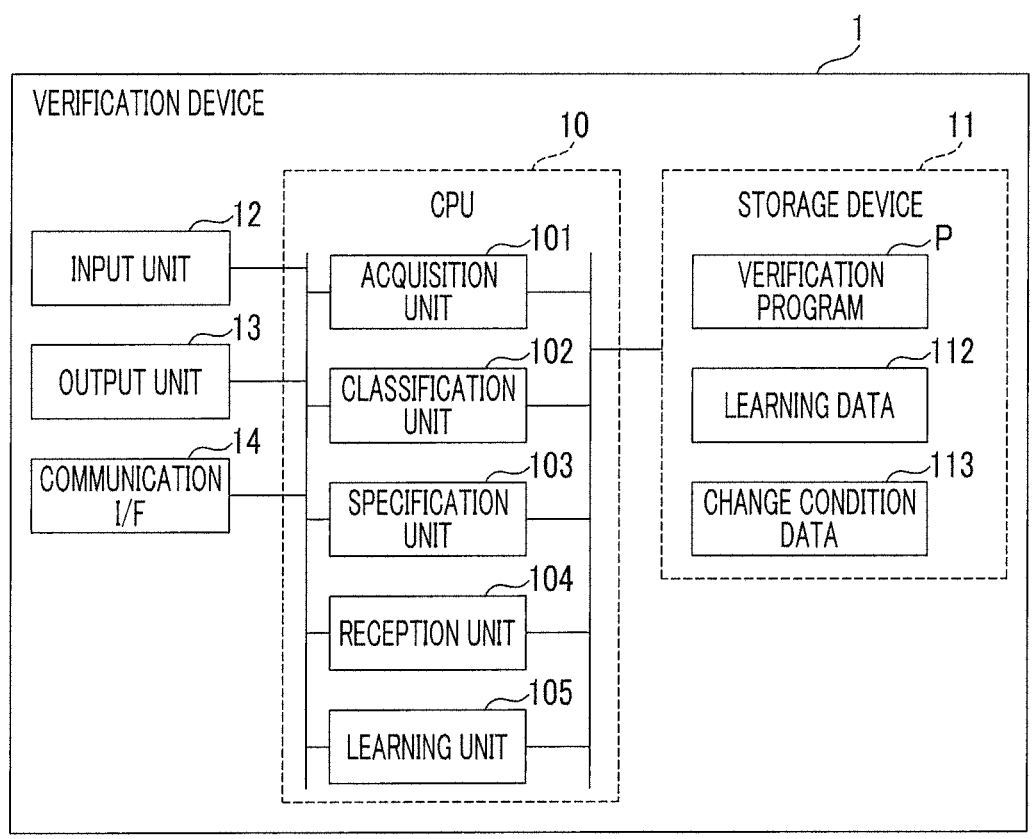
FIG. 2 is a block diagram illustrating another example of the verification device.

The verification device 1 is an information processing device such as a personal computer including a central processing unit (CPU) 10, a storage device 11, an input unit 12, an output unit 13, and a communication I/F 14 as illustrated in FIG. 2. The storage device 11 includes a verification program P, and the verification program P is executed so that the CPU 10 executes processes as the acquisition unit 101, the classification unit 102, the specification unit 103, a reception unit 104, and a learning unit 105.

In addition, the storage device 11 can store learning data 112 and change condition data 113 together with the verification program P.

The learning data 112 includes image data when there is no abnormality and image data when there is an abnormality which are specified as a target event. When an object to be verified by the verification device 1 relates to the presence or absence of a lesion, the learning data 112 includes image data (negative example data) when there is no predetermined lesion generated in an animal or a human and image data (positive example data) when there is a lesion which are specified as a target event.

In the learning data 112, a plurality of data sets are specified as learning data which is a positive example. For example, the plurality of pieces of positive example data are divided into groups for each predetermined number, and the groups can be set to be one data set. Specifically, when there are 1000 pieces of positive example data and 100 pieces of data are set to be one group, the pieces of data are divided into 10 groups. At this time, 100 pieces of data extracted randomly may be set to be one data set (group), and the repetition thereof may create a plurality of data sets (groups).

In the learning data 112, for example, all pieces of image data other than image data having a target lesion can be set to be pieces of negative example data. In addition, for example, image data having no lesion may be set to be negative example data. In addition, data having another lesion easily mistaken for a target lesion may be set to be negative example data. Meanwhile, learning data which is a negative example may also use a plurality of different data sets.

Figure 3A:
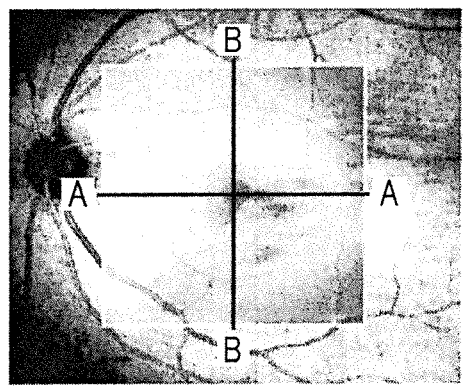
FIG. 3A is a diagram illustrating an example of an image acquired by the verification device taken along line A-A and B-B of a fundus image of a certain test subject.
Figure 3B:
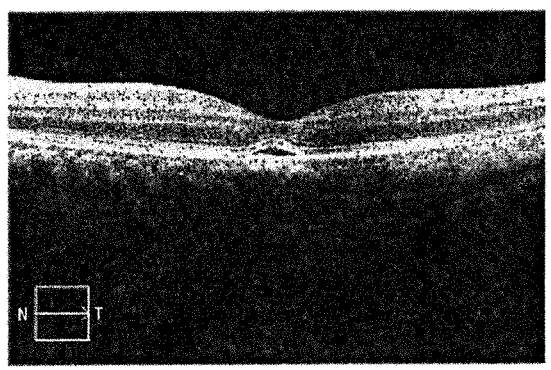
FIG. 3B is a diagram illustrating an example of an image acquired by the verification device obtained on the basis of A-A.
Figure 3C:
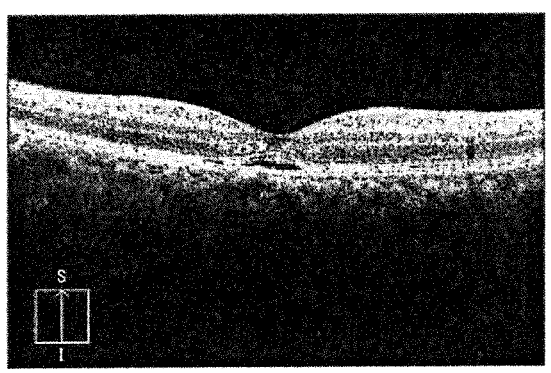
FIG. 3C is a diagram illustrating an example of an image acquired by the verification device obtained on the basis of B-B.

The change condition data 113 is data specifying a change condition for a weight value used by the specification unit 103 depending on an object to be verified. In the classification unit 102, the plurality of classifiers obtain values of classification results, but the weights of the values obtained by the respective classifiers may be different from each other. At this time, performing weighting is to obtain a weight value. In addition, it may be preferable to change the value of weighting depending on a method of acquiring target data. For example, when image data acquired by the acquisition unit 101 is a fundus image, a lesion appearing in the image data may be different depending on a method of acquiring the image, specifically, in which cross-section the image is acquired. For example, as illustrated in FIG. 3A, different results are obtained in cross-sections taken along line A-A and B-B of a fundus image of a certain test subject. For example, the image obtained on the basis of A-A is as illustrated in FIG. 3B, and the image obtained on the basis of B-B is as illustrated in FIG. 3C. In this case, determination results may be different from each other depending on the method of acquiring an image. Therefore, the images are data regarding a condition for changing a weight value depending on the type of image data, that is, a method of acquiring image data.

The acquisition unit 101 acquires image data which is an object to be verified. For example, the acquisition unit 101 may acquire the image data from an image capture device (not shown), or may acquire the image data from another information processing device. In addition, the wording "image data" as used herein is not limited to two-dimensional image data and three-dimensional image data, and may be data regarding an analysis result obtained from the two-dimensional image data or the three-dimensional image data.

The classification unit 102 includes a plurality of classifiers caused to learn the image data acquired by the acquisition unit 101, using a plurality of different pieces of learning data with respect to a target event, to obtain values indicating a possibility corresponding to the event. The value included in each classifier is a value indicating a possibility corresponding to the target event which is set to be the degree of certainty in a general classifier. The classification unit 102 includes at least one classifier caused to learn using the image data when there is no abnormality, and a plurality of classifiers caused to learn using the image data when there is an abnormality. When an object to be verified by the verification device 1 relates to the presence or absence of a lesion, the classification unit 102 includes at least one classifier caused to learn using learning data when there is no lesion, and a plurality of classifiers caused to learn using learning data when there is a lesion.

The classifier used in the classification unit 102 is a classifier such as a simple Bayesian classifier, which is specified by machine learning, and classifies events corresponding to target data newly given, by using learning data (teacher data) which is given in advance.

As described above, a plurality of different data sets are specified with respect to a target lesion in the learning data 112. Therefore, the classification unit 102 includes a plurality of classification units with respect to each data set. In addition, my method is not limited to one type of lesion, and it is possible to verify the presence or absence of a plurality of types of lesions by including pieces of data regarding the plurality of types of lesions as the learning data 112.

The specification unit 103 specifies the state of the object to be verified which is the image acquired by the acquisition unit 101 from the values obtained by the plurality of classifiers. The specification unit 103 specifies the possibility of presence or absence of an abnormality in an object to be verified as the state of the object to be verified by using a calculation expression (to be described later by using, for example, Expression (1)) which comprehensively considering the values obtained by the respective classifiers. When the object to be verified by the verification device 1 relates to the presence or absence of a lesion, the specification unit 103 specifies the possibility of presence or absence of a specific lesion as the state of an animal or a human which is an object to be verified.

The specification unit 103 calculates a weight value to weight the values in accordance with the values obtained by the plurality of classifiers to specify the state of the object to be verified which is the image acquired by the acquisition unit 101 from values obtained by weighting the values.

For example, to obtain the degree of certainty when a certain lesion 1 is generated, a value (the degree of certainty) $a=C_{1,N}(T)$ and a value (degree of certainty) $b=C_{1,other}(T)$ are used as weight values, as shown in Expression (1). $a=C_{1,N}(T)$ is obtained by a classifier in which image data in a case of the lesion 1 is used as a positive example and image data in a normal case is used as a negative example, and $b=C_{1,other}(T)$ is obtained by a classifier in which image data when the lesion 1 is used as a positive example and image data when other than the lesion 1 is used as a negative example. Meanwhile, $C_{1,2}(T)$ is a value (degree of certainty) which is obtained by a classifier in which image data when the lesion 1 is used as a positive example and image data when a lesion 2 is used as a negative example.

$$C_{1,N}(T)+((a+b)/2)\cdot C_{1,2}(T) \quad (1)$$

The above-described example of Expression (1) is an example in which "a weight value of the value obtained by the classifier in which the image data when the lesion 1 is used as a positive example and the image data when the lesion 2 is used as a negative example" is calculated using "the value obtained by the classifier in which the image data when the lesion 1 is used as a positive example and normal image data is used as a negative example" and "the value obtained by the classifier in which the image data when the lesion 1 is used as a positive example and the image data when other than the lesion 1 is used as a negative example."

In addition, the specification unit 103 extracts a change condition of a weight value associated with the type of image data acquired by the acquisition unit 101 from change condition data in which the types of image data and change conditions of weight values used for the weighting are associated with each other and which is stored in a change condition storage unit, and changes the weight value by using the extracted change condition, thereby specifying an event corresponding to the object to be verified which is the image acquired by the acquisition unit 101 by using the changed weight value. The specification unit 103 specifies the event corresponding to the object to be verified by using target data input to the reception unit 104, in addition to a specification result obtained on the basis of the image data acquired by the acquisition unit 101.

The reception unit 104 receives an input of target data acquired by another method with respect to the object to be verified together with the image data acquired by the acquisition unit 101. For example, when the verification device 1 verifies a lesion of an animal or a human, the target data is image data, obtained by an acquisition device, which is different from the image data acquired by the acquisition unit 101, data obtained as a result of blood collecting, data regarding the progress of a lesion so far, data regarding the background of treatment and the like. Specifically, when the image data acquired by the acquisition unit 101 is data regarding a fundus image, the reception unit 104 receives an input of data of another CT image or data obtained as a result of blood collecting.

The learning unit 105 causes the plurality of classifiers included in the classification unit 102 to learn by machine learning by using pieces of learning data corresponding to the respective classifiers.

Meanwhile, the number of types of image data acquired by the acquisition unit 101 may be two or more. For example, image data obtained by capturing a cross-section ("first cross-section") in a certain direction and image data obtained by capturing a cross-section ("second cross-section" different from the first cross-section) in another direction may be acquired.

When the first cross-section and the second cross-section are present, the classification unit 102 may classify the image data of the first cross-section and the image data of the second cross-section by the same classifier, and may perform classification by different classifiers learned using separate pieces of learning data 112. Meanwhile, when the first cross-section and the second cross-section are used, the learning data 112 includes a plurality of different data sets with respect to positive example data for the first cross-section and also includes a plurality of different data sets with respect to negative example data. In addition, the learning data 122 includes a plurality of different data sets with respect to positive example data for the second cross-section and also includes a plurality of different data sets with respect to negative example data.

Meanwhile, in the example illustrated in FIG. 2, one verification device 1 includes the acquisition unit 101, the classification unit 102, the specification unit 103, the reception unit 104, the learning unit 105, the verification program P, the learning data 112, and the change condition data 113, but is not limited thereto. For example, the verification device 1 may be constituted of a plurality of information processing devices. In addition, for example, the pieces of data 112 and 113 are stored in an external storage device connected to the verification device 1, and the verification device 1 may read out the pieces of data 112 and 113 from the external storage device.

Verification Method

Figure 4:
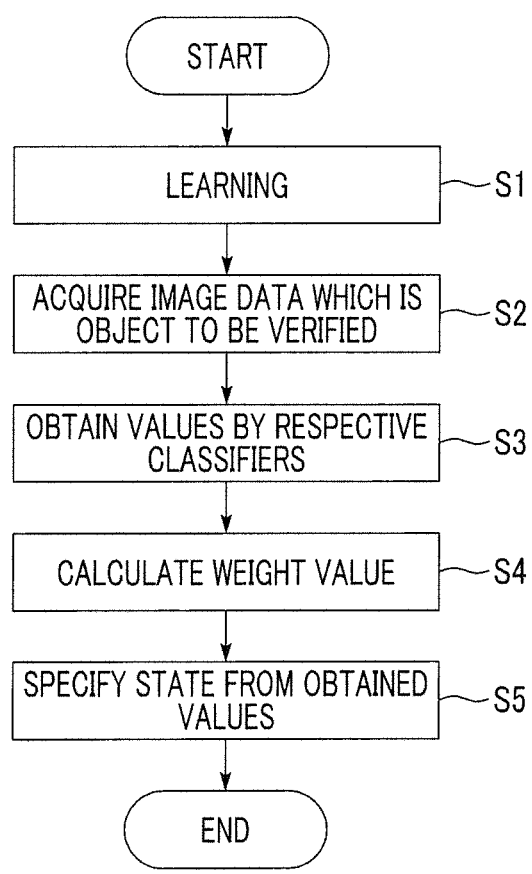
FIG. 4 is a flow chart illustrating an example of a verification method.

Hereinafter, processing in the verification device 1 will be described with reference to a flow chart illustrated in FIG. 4. In the verification device 1, the classifiers of the classification unit 102 are caused to learn by the learning unit 105 using the learning data 112 stored in the storage device 11 in advance (S1). The classifiers are caused to learn using learning data of different data sets in the learning data 112.

When verification is performed, the acquisition unit 101 acquire image data which is an object to be verified (S2).

Thereafter, each of the classifiers of the classification unit 102 obtains a value indicating a possibility corresponding a target event with respect to the image data acquired in step S2 (S3).

Subsequently, the specification unit 103 calculates a weight value used when specifying the state of the object to be verified which is the image acquired in step S2 from the values obtained in step S3 (S4).

In addition, the specification unit 103 obtains a value for specifying the state of the object to be verified by using the values obtained in step S3 and the weight value obtained in step S4 to specify the state of the object to be verified (S5).

Specific Example

A classifier caused to learn using data, which is sampled from all other pieces of data regarding a lesion D, that is, data having no lesion D seen therein, as negative example data is set to be a "classifier I." Similarly, a classifier using data determined to be normal data as negative example data is set to be a "classifier II." In addition, a classifier using data regarding another lesion D' as negative example data is set to be a "classifier III."

A plurality of classifiers I and a plurality of classifiers II are prepared with respect to the lesion D. In addition, when the lesion D', a lesion D", and the like hardly distinguishable from the lesion D are present, the classifier III is also prepared.

The specification unit 103 may output a plurality of candidates as a specification result of the state of the object to be verified. At this time, the specification unit 103 may output the candidates together with the value (degree of certainty) obtained by the classification unit 102, as the specification result. Further, the specification unit 103 may output identification information (for example, a classifier name) of a classifier obtaining a value equal to or greater than a threshold value and a list of values obtained by the classifier, as the specification result.

Meanwhile, the specification unit 103 may not specify the state of the object to be verified when all values obtained by the classification unit 102 do not reach the threshold value. Meanwhile, in the classification unit 102, the classifier I and the classifier II may obtain values in a first step. As a result, when there is another confused lesion, the classifier III may obtain a value. In this case, the verification device 1 may include the classifier III that performs classification into the lesion D and the other plurality of lesions D' and D" and the like.

Figure 5A:
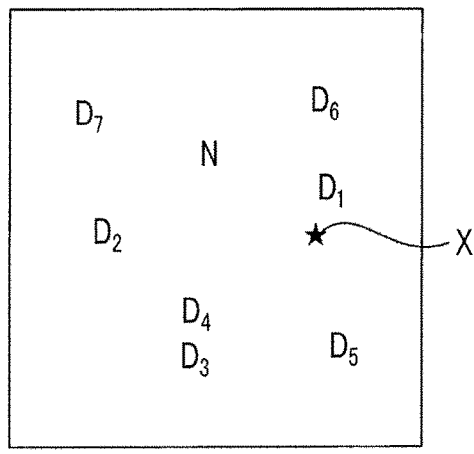
FIG. 5A is a diagram illustrating the verification method of distributions on a plane in a normal case (N) and when there is a lesion ($D_1$ to $D_7$).

FIG. 5A is an image illustrating distributions on a plane in a normal case (N) and when there is a lesion ($D_1$ to $D_7$). In addition, $D_1$ to $D_7$ represent a difference in the type of lesion. Meanwhile, X in FIG. 5A specifies the position of data X acquired by the acquisition unit 101.

Figure 5B:
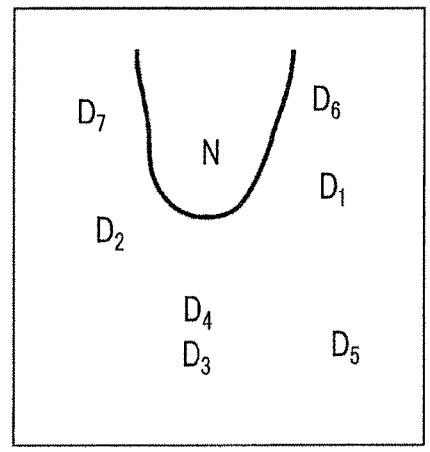
FIG. 5B is a diagram illustrating the verification method of a certain classifier classifying into normal and when there is a lesion.
Figure 5C:
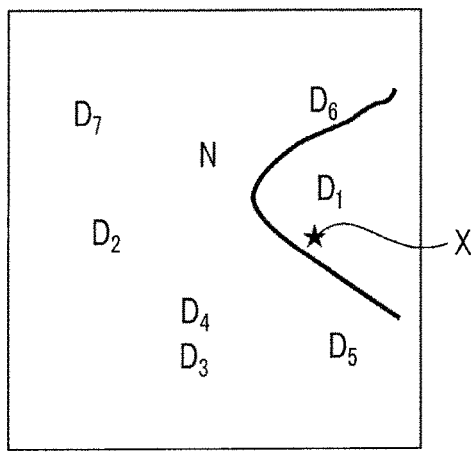
FIG. 5C is a diagram illustrating the verification method of a certain classifier $I_1$ classifying into $D_1$.
Figure 5D:
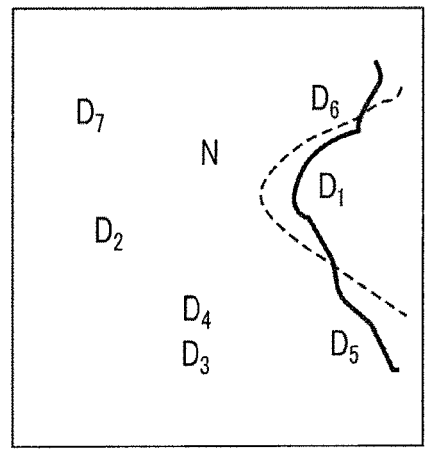
FIG. 5D is a diagram illustrating the verification method of a classifier $I_2$ classifying into $D_1$.

A certain classifier performs classification into normal and when there is a lesion, as illustrated in FIG. 5B. In addition, a certain classifier $I_1$ performs classification into $D_1$, as illustrated in FIG. 5C. Further, another classifier $I_2$ also performs classification into $D_1$, as illustrated in FIG. 5D. Both the classifier $I_1$ and the classifier $I_2$ are classifiers for determining whether being the lesion $D_1$, but these classifiers use different data sets as learning data. Therefore, it is possible to improve the accuracy of verification in the verification device 1 by combining a result of the classifier $I_1$ and a result of the classifier $I_2$ with each other. For example, as illustrated in FIG. 5C, a degree of certainty $c_1$ that the data X obtained when using the classifier $I_1$ is the lesion $D_1$ is different from a degree of certainty $c_2$ that the data X obtained when using the classifier $I_2$ is the lesion $D_1$. That is, it is possible to improve the accuracy of verification in the verification device 1 by using the plurality of classifiers $I_1$ and $I_2$ with respect to the same lesion $D_1$.

Figure 6A:
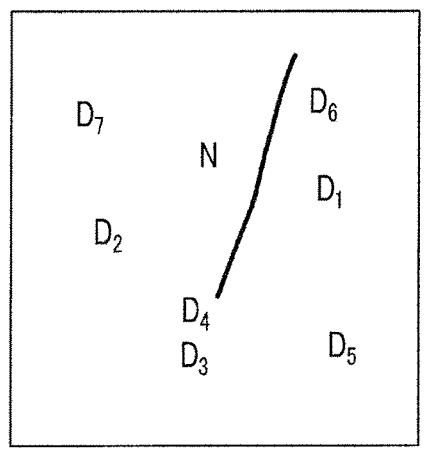
FIG. 6A is another diagram illustrating the verification method in the verification device by using the classifier II.
Figure 6B:
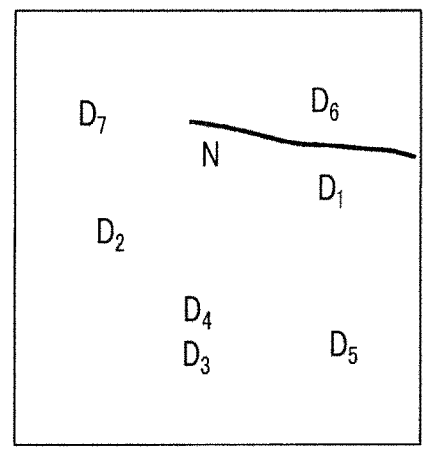
FIG. 6B is another diagram illustrating the verification method in the verification device by using the classifier III.
Figure 6C:
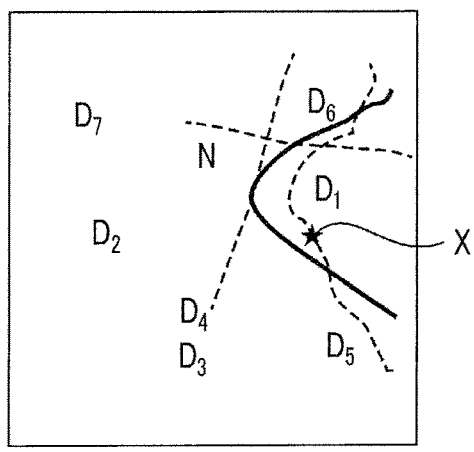
FIG. 6C is another diagram illustrating the verification method in the verification device determining a combination of values obtained by all of the classifiers with each other.

In addition, it is possible to further improve the accuracy of verification in the verification device 1 by using the classifier II illustrated in FIG. 6A and the classifier III illustrated in FIG. 6B and determining a combination of values obtained by all of the classifiers with each other as illustrated in FIG. 6C. Specifically, the classifier II illustrated in FIG. 6A is a classifier that performs only classification into normal and $D_1$ and does not consider the other pieces of data. In addition, the classifier III illustrated in FIG. 6B is a classifier that performs only classification into $D_1$ and $D_6$ and does not consider the other pieces of data.

For example, when the classifier $I_1$ obtains a result that the degree of certainty $c_1$ of being $D_1$ is 0.9 and the classifier III obtains a result that a degree of certainty $c_4$ of being $D_1$ is 0.9, the specification unit 103 can output a result that the possibility of being $D_1$ is approximately 0.9.

On the other hand, when the classifier $I_1$ obtains a result that the degree of certainty $c_1$ of being $D_1$ is 0.1 and the classifier III obtains a result that the degree of certainty $c_4$ of being $D_1$ is 0.9, the specification unit 103 does not output a result that the possibility of being $D_1$ is approximately 0.9 by decreasing the weight of the degree of certainty $c_4$ obtained by the classifier III.

Determination Example

For example, the classification unit 102 obtains degrees of certainty by using seven classifiers with respect to a certain image, as follows:

A degree of certainty based on a classifier ERM-2: 0.96
A degree of certainty based on a classifier ERM-N: 0.95
A degree of certainty based on a classifier abnormal: 0.94
A degree of certainty based on a classifier ERM-1: 0.93
A degree of certainty based on a classifier wetAMD-3: 0.67
A degree of certainty based on a classifier wetAMD-1: 0.54.

In addition, the specification unit 103 specifies that the image relates to "ERM," as a comprehensive result based on the degrees of certainty obtained by the plurality of classifiers. "ERM" and "wetAMD" are types of lesions. In addition, the classifier ERM-2, the classifier ERM-N, and the classifier ERM-1 are classifiers that perform classification with respect to "ERM." Further, the classifier wetAMD-3 and the classifier wetAMD-1 are classifiers that perform classification with respect to "wetAMD." In addition, the classifier abnormal is a classifier that performs classification with respect to the presence or absence of a lesion regardless of the type of lesion.

In the degrees of certainty based on the above-described plurality of classifiers, there is a tendency for the degree of certainty regarding "ERM" to be high, and thus the specification unit 103 specifies "ERM."

In this manner, the verification device 1 adjusts the degrees of certainty obtained by the plurality of classifiers by a weight value using the degrees of certainty, and finally specifies the state of the object to be verified.

In the above description, an example in which the verification device 1 verifies the possibility of presence or absence of a lesion has been described, but this disclosure is not limited thereto. For example, an image of a product can be used for the verification of presence or absence of foreign matter mixed during the manufacture of the product or the verification of a defect. In addition, an image of a semiconductor substrate manufactured can be used for the verification of a defect of a semiconductor part disposed on the substrate.

As described above, in the verification device 1, a plurality of classifiers caused to learn using different pieces of learning data are used with respect to one event. In addition, in the verification device 1, a final result is obtained by combining results of the plurality of classifiers with each other. Thereby, it is possible to decrease the probability of a target event being overlooked. At this time, a large number of pieces of learning data are used as a plurality of data sets, and thus it is possible to prevent a bad effect due to over-learning.

Further, in the verification device 1, it is possible to verify not only one type of event, but also a plurality of types of events by combining classifiers caused to learn using learning data of a plurality of events with each other.

Figure 7:
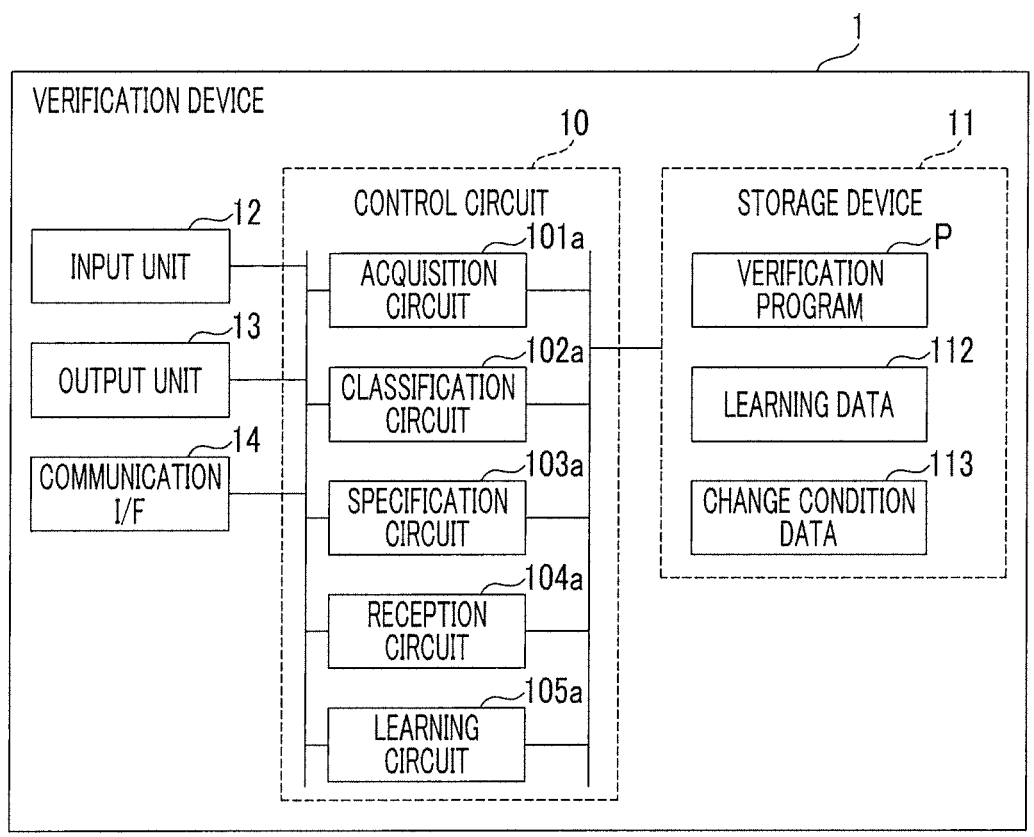
FIG. 7 is a block diagram illustrating a circuit configuration of the verification device.

In addition, verification processing is realized by the CPU of the verification device 1 executing the verification program P and the like, but may be realized by a logic circuit (hardware) or a dedicated circuit which is formed in an integrated circuit (IC) chip, a large scale integration (LSI) or the like of the verification device 1. In addition, these circuits may be realized by one or a plurality of integrated circuits, or the functions of the above-described plurality of functional units may be realized by one integrated circuit. The LSI may also be referred to as a VLSI, a super LSI, a ultra LSI, or the like by a difference in the degree of integration. That is, as illustrated in FIG. 7, the verification device 1 may be constituted by an acquisition circuit 101a, a classification circuit 102a, a specification circuit 103a, a reception circuit 104a, and a learning circuit 105a, and the functions thereof are the same as those of the above-described units having the same names.

In addition, the verification program P may be recorded in a CPU-readable recording medium. Examples of the recording medium include a "non-transitory tangible medium" such as a tape, a disk, a card, a semiconductor memory, and a programmable logic circuit. In addition, the retrieval program may be supplied to the processor through any transmission medium (a communication network, a broadcast wave, or the like) which allows the retrieval program to be transmitted. My method can also be realized in the form of a data signal in which the video display program is embodied through electronic transmission and which is embedded in a carrier wave.

Meanwhile, the verification program P can be mounted using a script language such as ActionScript, JavaScript (registered trademark), Python, or Ruby, a compiler language such as C, C++, C#, Objective-C, or Java (registered trademark) or the like.

The invention claimed is:

1. A verification device comprising:
    an acquisition circuit that acquires image data which is an object to be verified;
    a classification circuit that includes a plurality of classifiers caused to learn the image data acquired by the acquisition circuit, using a plurality of different pieces of learning data with respect to a target event, to obtain values indicating a possibility corresponding to the target event; and
    a specification circuit that specifies a state of the object to be verified which is the image data acquired by the acquisition circuit from the values obtained by the plurality of classifiers,
    wherein
    the pieces of learning data include image data when there is no predetermined lesion generated in an animal or a human and image data when there is a lesion which are specified as a target event,
    the classification circuit includes at least one classifier among the plurality of classifiers caused to learn using the learning data when the lesion is not present and other classifiers among the plurality of classifiers caused to learn using the learning data when the lesion is present, and
    the specification circuit 1) specifies a possibility of presence or absence of the specific lesion as a state of the animal or the human which is the object to be verified, 2) calculates a weight value to weight the values in accordance with the values obtained by the plurality of classifiers to specify a state of the object to be verified which is the image acquired by the acquisition circuit from values obtained by weighting the values, and 3) extracts a change condition from among a plurality of predefined change conditions stored in a change condition storage device, the plurality of predefined change conditions comprising predefined weight values associated with different types of image data, the extracted change condition comprising a weight value among the predefined weight values associated with a type of image data acquired by the acquisition circuit, and changes the weight value by using the extracted change condition, thereby specifying an event corresponding to the object to be verified which is the image acquired by the acquisition circuit by using the changed weight value.

2. The verification device according to claim 1, wherein
    the pieces of learning data include image data when there is no abnormality and image data when there is an abnormality which are specified as the target event,
    the classification circuit includes the at least one classifier caused to learn using the image data when the abnormality is not present and the other classifiers caused to learn using the image data when the abnormality is present, and
    the specification circuit specifies a possibility of presence or absence of the abnormality in the object to be verified as the state of the object to be verified.

3. The verification device according to claim 1, further comprising:
    a reception circuit that receives an input of target data acquired by another method with respect to the object to be verified, together with the image data acquired by the acquisition circuit,
    wherein the specification circuit specifies the event corresponding to the object to be verified by using the target data which is input to the reception circuit, in addition to a specification result obtained on the basis of the image data acquired by the acquisition circuit.

4. The verification device according to claim 1, further comprising:
    a learning circuit that causes the plurality of classifiers to learn using the pieces of learning data corresponding to the respective classifiers.

5. A verification method comprising:
    acquiring image data which is an object to be verified with an acquisition circuit;
    obtaining values indicating a possibility corresponding to a target event by a plurality of classifiers caused to learn the acquired image data, using a plurality of different pieces of learning data with respect to the target event with a classification circuit; and
    specifying a state of the object to be verified which is the acquired image data from the obtained values with a specification circuit,
    wherein
    the pieces of learning data include image data when there is no predetermined lesion generated in an animal or a human and image data when there is a lesion which are specified as the target event,
    the classification circuit includes at least one classifier among the plurality of classifiers caused to learn using the learning data when the lesion is not present and other classifiers among the plurality of classifiers caused to learn using the learning data when the lesion is present, and
    the specification circuit 1) specifies a possibility of presence or absence of the specific lesion as a state of the animal or the human which is the object to be verified, 2) calculates a weight value to weight the values in accordance with the values obtained by the plurality of classifiers to specify a state of the object to be verified which is the image acquired by the acquisition circuit from values obtained by weighting the values, and 3) extracts a change condition from among a plurality of predefined change conditions stored in a change condition storage device, the plurality of predefined change conditions comprising predefined weight values associated with different types of image data, the extracted change condition comprising a weight value among the predefined weight values associated with a type of image data acquired by the acquisition circuit, and changes the weight value by using the extracted change condition, thereby specifying an event corresponding to the object to be verified which is the image acquired by the acquisition circuit by using the changed weight value.

6. A non-transitory computer readable medium comprising a verification program causing a computer to execute functions of:

acquiring image data which is an object to be verified with an acquisition circuit;

causing a plurality of classifiers to learn the acquired image data, using a plurality of different pieces of learning data with respect to a target event, and to obtain values indicating a possibility corresponding to the target event with a classification circuit; and specifying a state of the object to be verified which is the acquired image data from the values obtained by the plurality of classifiers with a specification circuit, wherein the pieces of learning data include image data when there is no predetermined lesion generated in an animal or a human and image data when there is a lesion which are specified as a target event, the classification circuit includes at least one classifier among the plurality of classifiers caused to learn using the learning data when the lesion is not present and other classifiers among the plurality of classifiers caused to learn using the learning data when the lesion is present, and the specification circuit 1) specifies a possibility of presence or absence of the specific lesion as a state of the animal or the human which is the object to be verified, 2) calculates a weight value to weight the values in accordance with the values obtained by the plurality of classifiers to specify a state of the object to be verified which is the image acquired by the acquisition circuit from values obtained by weighting the values, and 3) extracts a change condition from among a plurality of predefined change conditions stored in a change condition storage device, the plurality of predefined change conditions comprising predefined weight values associated with different types of image data, the extracted change condition comprising a weight value among the predefined weight values associated with a type of image data acquired by the acquisition circuit, and changes the weight value by using the extracted change condition, thereby specifying an event corresponding to the object to be verified which is the image acquired by the acquisition circuit by using the changed weight value.

\* \* \* \* \*